United States Patent
Saruyama et al.

(10) Patent No.: US 10,017,000 B2
(45) Date of Patent: Jul. 10, 2018

(54) PHOSPHOR-CONTAINING IDENTIFICATION SUBSTANCE AND METHOD FOR PRODUCING THE SAME

(71) Applicant: Fuji Polymer Industries Co., Ltd., Nagoya-shi, Aichi (JP)

(72) Inventors: Toshio Saruyama, Aichi (JP); Makoto Goto, Aichi (JP); Takumi Kataishi, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 319 days.

(21) Appl. No.: 14/903,219

(22) PCT Filed: Mar. 18, 2015

(86) PCT No.: PCT/JP2015/058104
§ 371 (c)(1),
(2) Date: Jan. 6, 2016

(87) PCT Pub. No.: WO2015/170514
PCT Pub. Date: Nov. 12, 2015

(65) Prior Publication Data
US 2016/0144650 A1 May 26, 2016

(30) Foreign Application Priority Data
May 9, 2014 (JP) .................................. 2014-098132

(51) Int. Cl.
*C09K 11/02* (2006.01)
*B42D 25/36* (2014.01)
(Continued)

(52) U.S. Cl.
CPC ............ *B42D 25/36* (2014.10); *B29C 43/003* (2013.01); *B29C 43/305* (2013.01);
(Continued)

(58) Field of Classification Search
None
See application file for complete search history.

(56) References Cited

U.S. PATENT DOCUMENTS

| 5,942,332 A | 8/1999 | Nakamura et al. |
| 6,083,853 A | 7/2000 | Fujimoto et al. |

(Continued)

FOREIGN PATENT DOCUMENTS

| JP | 52-014642 B | 4/1977 |
| JP | 57-049589 B | 10/1982 |

(Continued)

OTHER PUBLICATIONS

International Search Report issued in International Application No. PCT/JP2015/058104, dated Jun. 16, 2015, 4 pages.

*Primary Examiner* — Robert S Loewe
(74) *Attorney, Agent, or Firm* — Hamre, Schumann, Mueller & Larson, P.C.

(57) ABSTRACT

A phosphor-containing identification substance of the present invention includes a substrate and a phosphor-containing silicone thin layer. The whole or part of the surface of the substrate is covered with the phosphor-containing silicone thin layer. The phosphor has identification properties that the phosphor emits light when irradiated with ultraviolet rays or black light, and does not emit light when irradiated with visible rays. A method for producing the phosphor-containing identification substance of the present invention includes bringing a silicone composition for forming a phosphor-containing thin layer into contact with the substrate after or simultaneously with the molding of the substrate, followed by heating. This provides the phosphor-containing identification substance that can be applied to a silicone thin film, has excellent adhesive properties with the substrate, and maintains the inherent properties of the substrate without (Continued)

being impaired by marking, and the method for producing the same.

13 Claims, 1 Drawing Sheet

(51) Int. Cl.
    *B29C 43/00*         (2006.01)
    *B29C 43/30*         (2006.01)
    *D21H 21/48*         (2006.01)
    *B42D 25/387*       (2014.01)
    *C09K 11/06*         (2006.01)
    *C09K 11/08*         (2006.01)
    *B29K 83/00*         (2006.01)
    *B29K 105/00*       (2006.01)

(52) U.S. Cl.
    CPC ............ *B42D 25/387* (2014.10); *C09K 11/02* (2013.01); *C09K 11/06* (2013.01); *C09K 11/08* (2013.01); *D21H 21/48* (2013.01); *B29K 2083/00* (2013.01); *B29K 2105/007* (2013.01); *B29K 2995/0018* (2013.01); *B29K 2995/0098* (2013.01)

(56) References Cited

U.S. PATENT DOCUMENTS

| | | | | |
|---|---|---|---|---|
| 6,140,258 | A | 10/2000 | Fujimoto et al. | |
| 6,203,069 | B1 * | 3/2001 | Outwater | G09F 3/0294 283/81 |
| 6,536,672 | B1 * | 3/2003 | Outwater | G09F 3/0294 235/468 |
| 6,660,203 | B1 | 12/2003 | Fujimoto et al. | |
| 6,986,581 | B2 * | 1/2006 | Sun | G03B 21/60 353/31 |
| 6,990,903 | B2 * | 1/2006 | Butland | G07D 7/128 101/108 |
| 7,910,022 | B2 * | 3/2011 | Agrawal | C09K 11/08 106/31.15 |
| 8,684,784 | B2 * | 4/2014 | Schmidt | B44F 1/10 273/251 |
| 2004/0076460 | A1 * | 4/2004 | Yu | B43L 1/008 401/1 |
| 2007/0120135 | A1 * | 5/2007 | Soules | H01L 33/507 257/98 |
| 2007/0293623 | A1 | 12/2007 | Kashiwagi et al. | |
| 2010/0062194 | A1 * | 3/2010 | Sun | B42D 25/00 428/29 |
| 2011/0031516 | A1 * | 2/2011 | Basin | H01L 33/507 257/98 |
| 2012/0125228 | A1 | 5/2012 | Iftime | |
| 2012/0165450 | A1 | 6/2012 | Burrows et al. | |
| 2013/0328100 | A1 | 12/2013 | Kona et al. | |

FOREIGN PATENT DOCUMENTS

| | | |
|---|---|---|
| JP | 5-324942 | 12/1993 |
| JP | 10-006440 | 1/1998 |
| JP | 10-183110 | 7/1998 |
| JP | 11-070924 | 3/1999 |
| JP | 11-080632 | 3/1999 |
| JP | 2002-169469 | 6/2002 |
| JP | 2006-001103 | 5/2006 |
| JP | 3136937 U | 11/2007 |
| JP | 2008-093932 | 4/2008 |
| JP | 2009-241405 | 10/2009 |
| JP | 2012-082135 | 4/2012 |
| JP | 2012-111946 | 6/2012 |
| JP | 4949130 B | 6/2012 |
| JP | 2013-258209 | 12/2013 |

* cited by examiner

PHOSPHOR-CONTAINING IDENTIFICATION SUBSTANCE AND METHOD FOR PRODUCING THE SAME

TECHNICAL FIELD

The present invention relates to a phosphor-containing identification substance that can be identified by light irradiation, and a method for producing the same. Specifically, the present invention relates to a phosphor-containing identification substance with its surface provided with a phosphor for use in identification, and a method for producing the same.

BACKGROUND ART

Conventionally, for identification use, various compositions and methods for conducting marking on patterns or characters have been proposed. Patent Document 1 proposes a marking ink composition obtained by adding a pigment to an addition curable silicone compound having a specific composition. Patent Document 2 proposes a marking ink composition obtained by adding a pigment to a condensation curable silicone compound having a specific composition, and a printing method using the same. Both patent documents feature the marking ink compositions having adhesive properties to cured silicone substrates with a rapid cure rate. The base polymers of these marking ink compositions are silicone the same as those of the substrates to be marked, but the compositions are very different from the substrates. Therefore, the surface properties of the substrate covered with such a marking composition are different from those of the substrate. According to the intended use, the properties of the substrate are adjusted to be optimum by selecting materials having suitable properties or by customizing the composition. For example, such properties include suitable flexibility to follow vibrations and temperature changes, and compressibility for maintaining sealing properties and heat conductivity. The suitable properties according to the intended use often include the surface properties as well as the bulk physical properties. For example, the surface properties such as an adhesive properties and tackiness are crucial in maintaining the sealing properties and the heat conductivity. Nevertheless, marking is for the purpose of identification and is irrelevant to the suitable properties of the substrate according to the intended use. In fact, however, marking can deteriorate the properties of the substrate, particularly the surface properties of the substrate. For example, the adhesive properties and tackiness of the substrate surface can be decreased by marking. This is a problem in conducting marking on silicone-based materials or components, and had not been solved.

Various phosphor-containing curable silicone compositions have been proposed in recent years. These numerous proposals, Patent Document 3 as an example, relate to a phosphor-containing silicone composition for use in converting LED light colors. Similar to Patent Document 1 and Patent Document 2, the composition of Patent Document 3 is curable, and therefore does not provide a solution to the problem of conducting marking without changing the surface properties of the substrate. On the other hand, the usability of a so-called invisible ink composition has been recognized. Therefore, the invisible ink composition can easily be identified by ultraviolet light irradiation while it is almost invisible to the naked eye in a visible light region. In the visible ink composition, a phosphor that emits visible light when irradiated with ultraviolet light is used instead of a pigment. In particular, the great advantage of the invisible ink composition is that identification can be conducted easily by ultraviolet light or black light irradiation without the use of the invisible ink being noticed by others. For silicone-made industrial assembly parts related manufacturing and supplying industries, the detection of counterfeits is a typical example of the advantage. Patent Document 4 is an example of the use of such invisible ink. Although the example of Patent Document 4 shows only a vinyl chloride polymer as a resin component of the invisible ink and a substrate, a silicone polymer is also exemplified to be effective. However, the resin component of the invisible ink has been assumed to be curable. Therefore, the problem of conducting marking without changing the surface properties of the substrate remains unresolved when the invisible ink is applied to a silicone-based material. Patent Document 5 proposes water-based invisible ink for inkjet printing. However, it is difficult to apply the water-based invisible ink to the silicone material.

A technique not for identification purposes has been proposed in which a rubber layer is formed by increasing a cross-linking density in the vicinity of the surface of a silicone gel material (Patent Documents 6 and 7). In this technique; first, a silicone having a SiH group as a cross-linking component for an addition curing is applied to a release film before curing an addition curable silicone gel, which is to be a substrate. Then, the release film is disposed on the substrate, and heated and cured to produce a molded product. However, this is an opposite approach to solve the problem of conducting marking without changing the surface properties of the substrate.

Patent Document 1: JP-S52 (1977)-14642 B
Patent Document 2: JP-S57 (1982)-49589 B
Patent Document 3: JP-4949130
Patent Document 4: JP 2002-169469 A
Patent Document 5: JP 2012-111946 A
Patent Document 6: JP-H10 (1998)-6440 A
Patent Document 7: JP-H10 (1998)-183110 A

DISCLOSURE OF INVENTION

Problems to be Solved by the Invention

As described above, the conventional technology has a problem that it is difficult to conduct marking without changing the surface properties of the substrate.

In order to solve the above-mentioned conventional problem, the present invention provides a phosphor-containing identification substance that can be applied as a silicone thin film, has an excellent adhesive properties with a substrate, and maintains the inherent properties of the substrate by marking, and a method for producing the same.

A phosphor-containing identification substance of the present invention includes a substrate and a phosphor-containing silicone thin layer. The whole or part of the surface of the substrate is covered with the phosphor-containing silicone thin layer. The phosphor has identification properties that the phosphor emits light when irradiated with ultraviolet rays or black light, and not emit light when irradiated with visible rays.

A method for producing the phosphor-containing identification substance of the present invention is a method for producing the above mentioned phosphor-containing identification substance. The substrate is brought into contact with a silicone composition for forming a phosphor-containing thin film after or simultaneously with the molding process thereof, and then heat treated or compressed.

The phosphor-containing identification substance of the present invention has the surface provided with marking so that identification can be achieved easily by light irradiation, in particular by ultraviolet rays or black light irradiation, has excellent adhesive properties between marking and substrate; and moreover, maintains the inherent properties of the substrate without being impaired by marking. Therefore, it can be applied to identification substances for use in assembly parts made of moldings and the like, and can be utilized in preventing confusion of assembly parts, or deterrence of counterfeit.

DESCRIPTION OF THE INVENTION

Figure 1A:
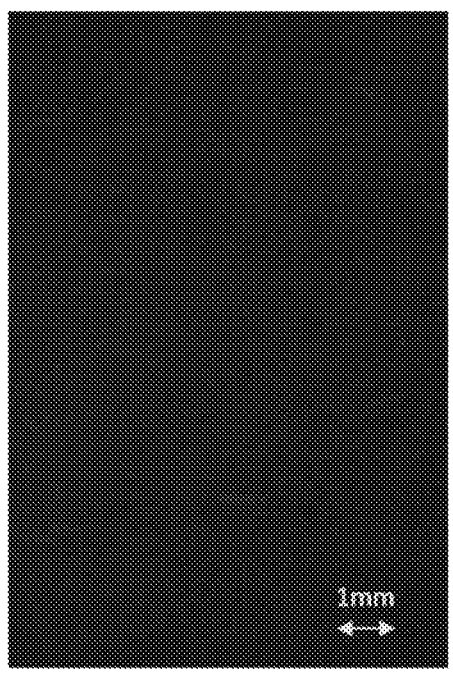
FIG. 1A is an observation photograph of a phosphor-containing identification substance in the form of a silicone molding in an indoor general illumination.

In the present invention, the substrate may be made of, e.g., resin, paper, metal, ceramics or fiber. The whole or part of the surface of the substrate is covered with a phosphor-containing silicone thin layer. The phosphor has identification properties that the phosphor emits light when irradiated with ultraviolet rays or black light, and not emit light when irradiated with visible rays. The thickness of the phosphor-containing silicone thin layer is preferably 0.1 to 20 μm, and more preferably 0.5 to 15 μm.

The shape of the substrate is preferably a sheet shape. However, no limitation is imposed on the shape of the substrate as long as it achieves the effect of the present invention. Besides the sheet shape, the shape may be, e.g., a column, a prism, a hollow body, and a sheet having a complicated surface shape.

Hereinafter, the substrate is described in detail by exemplifying a silicone molding. If the substrate is a silicone molding, a composition for the substrate contains a base polymer composed of a single or a plurality of silicone polymers. It is often cured by adding curable components such as crosslinking agents or curing catalysts, or adhesiveness-imparting silicone resins. A composition consisting only of the base polymer and the curable component can be used as the composition for the substrate. A composition obtained by adding inorganic fillers, flame retardants, heat resistance improvers or pigments can also be used as the composition for the substrate. Commonly, the composition for the substrate containing the base polymer, the inorganic filler and the like is finally cured. However, any uncured composition having self-shape retention such as putty can be used for the substrate.

A silicone polymer, which is the main component of the composition for the substrate, is typically a linear polydiorganosiloxane composed of diorganosiloxane units. The end of the polymer is blocked by, e.g., a hydroxyl group, a hydrogen atom, a monovalent organic group, or a silyl group having a hydrolyzable group such as a trimethoxysilyl group. A branched polysiloxane partly having monoorganosiloxane units can also be used. The silicone polymer as the main component of the composition for the substrate may be, e.g., a net-like polysiloxane composed of triorganosiloxane units, diorganosiloxane units, mono-organsiloxane units, and $SiO_2$ units, and a resinous polysiloxane.

The organic groups of the silicone polymer include an alkyl group such as a methyl group, an aryl group such as a phenyl group, a substituted alkyl group such as a 1,1,1-trifluoropropyl group, and an alkenyl group such as a vinyl group. In particular, most of the organic groups are generally a methyl group. An appropriate amount of an alkenyl group such as a vinyl group is used for controlling peroxide curing and for conducting addition curing by a hydrosilylation reaction. A phenyl group is used for forming a substrate having a high refractive index or a substrate capable of maintaining its rubber-like consistency at a low temperature. A 1,1,1-trifluoropropyl group is used for improving the oil resistance and lowering surface tension.

Although no limitation is imposed on the inorganic filler used for the composition for the substrate, examples of the inorganic filler include silica such as fine particulate silica, a quartz powder and diatomaceous earth, metal oxides such as an alumina, metal hydroxides such as aluminum hydroxide, metal carbonates such as calcium carbonate, metal nitrides such as aluminum nitride, metal powders such as an aluminum powder, a silver powder, and a boron nitride powder, carbon black, and graphite. They may be used as a powder or fibers.

As shown above, any conventionally known compositions as well as all silicone compositions that will be proposed in the future can be used for the composition for the substrate of the present invention with no limitation, as long as a final silicone molding can maintain its own shape in an environment where no external force other than gravity acts.

A composition used for marking contains silicone and a phosphor as the main components. The phosphor may be a phosphor pigment capable of emitting fluorescence, or a phosphor having a structure in which a phosphor dye is fixed to a resin and the like. Among them, a phosphor compound that emits fluorescence by exposed with light of a wavelength around 400 nm, but is almost invisible to the naked eye under normal visible light wavelength is particularly used for the silicone molding of the present invention. These phosphor compounds have been used as the main component of the invisible ink, and regularly used for identification under black light irradiation that is close to ultraviolet light. Although no limitation is imposed on the shape of the phosphor a needle shape, or a particle shape is preferred. The needle shape phosphor having an average diameter (D) of 0.1 to 20 μm, an average length (L) of 0.5 to 2000 μm, and L/D of 3 to 2000 is preferable. The particle shape phosphor having the average particle diameter of 0.1 to 100 μm is preferred. These phosphors may be crushed before use. The phosphor having heat resistance so as not to be deteriorated at a temperature of 120° C. or more is preferred. The phosphor having resistance to heat of 120° C. or more does not deteriorate during heat curing of the silicone. Furthermore, the phosphor that prevents Pt catalyst poisoning is preferable, because the poisoned catalyst causes curing inhibition when the silicone molding is used for the silicone thin layer or substrate. Such phosphor compounds may preferably be an organic phosphor pigment or an inorganic phosphor pigment, including, e.g., an organic invisible fluorescent product number "D034" (inorganic phosphor pigment), and "DINV series" (organic phosphor pigment) manufactured by DayGlo Color Corp.

Another main component of the composition used for marking is a silicone for marking, which is crucial in bringing the substrate and the silicone thin layer into an inseparable state. It is preferred that the silicone for marking and the silicone as the main component of the composition for the substrate are compatible with each other. For example, when the main component of the composition for the substrate is silicone having a methyl group as the main organic group, it is preferable to select the silicone for marking having a methyl group as the main organic group. It is preferable to secure compatibility of both silicones in this manner. For example when the main component of the composition for the substrate is silicone having a methyl group and a phenyl group, it is preferable to select the silicone for marking having a methyl group and a phenyl group to the same degree. The most reliable method is to use the identical silicone for both the composition for the substrate and the silicone for marking.

If the composition for the substrate is capable of being cured by a peroxide or an addition reaction (hydrosilylation reaction) between an alkenyl group and a SiH group, the silicone for marking is preferably a silicone having an alkenyl group, and more preferably used in combination with an organohydrogensiloxane having a SiH group. The amount of organohydrogensiloxane used and the average number of the SiH groups per molecule are preferably within a range that allows the silicone for marking having the alkenyl to be cured by an addition reaction. For example, when the silicone for marking has two alkenyl groups per molecule, it is preferable that the organohydrogensiloxane has 3 or more SiH groups per molecule. In addition, it is desirable that the ratio of the number of the SiH groups in one molecule of the organohydrogensiloxane to the number of the alkenyl groups in one molecule of the silicone for marking is in a range from 0.5 to 5.0.

When the composition for the substrate is capable of being cured by a peroxide or an addition reaction, the composition for marking may include an addition reaction catalyst in addition to the alkenyl group-containing silicone and the organohydrogensiloxane. A platinum catalyst is commonly used for the addition reaction. Examples of the platinum catalyst include platinum black, chloroplatinic acid, an isopropanol solution of chloroplatinic acid, and a platinum complex having a vinyl siloxane as ligand. When the composition for marking is cured on the surface of the already cured substrate, it is preferable to add a curing catalyst. However, it should be noted that the composition for marking containing the addition reaction catalyst likely to cause problems such as a difficulty in maintaining the surface physical properties of the substrate and a decrease in the storage stability of the composition for marking. As described later, the composition for the substrate and the phosphor-containing composition for marking are best to be cured simultaneously in order to bring the substrate and the phosphor-containing thin film into an inseparable state. In that case, no addition reaction catalyst is to be added to the phosphor-containing composition for marking, and thus the phosphor-containing composition for marking having no addition reaction catalyst is preferred to prevent the undesirable effects described above.

It is desirable that the composition for marking includes a curing retarder for the addition reaction. Any conventionally known compound having effects as a curing retarder may be used as long as it does not interfere with the performance of the silicone molding of the present invention. Examples of such compounds include a phosphorus-containing compound such as triphenylphosphine, a nitrogen-containing compound such as tributylamine, tetramethylethylenediamine and benzotriazol, a sulfur-containing compound, an acetylene-based compound, a compound containing two or more alkenyl groups, a hydroperoxy compound, and maleic acid derivatives. Of those, a compound having an alkenyl group or an alkynyl group is preferable, specifically, a compound having two or more alkynyl groups per molecule, a compound having an alkenyl group and an alkynyl group per molecule, a compound having an alkenyl group and an alcoholic hydroxy group per molecule, an organic silicon compound having bond units in which alkenyl groups are coupled with both sides of silicon atoms adjacent to each other via oxygen atoms, and a maleic acid diester are preferred.

Additives such as fillers, adhesion promoters and anti-reflective additives may be added to the composition for marking, if necessary.

It is not easy for those who are outside of silicone manufacturers, to optimally choice and mix the silicone and the component related to curing in the composition for marking. This is because the silicone component contained in the composition for the substrate will never be disclosed by the silicone manufacturers, and even though it is known, difficulties still remain to obtain suitable silicone or organohydrogensiloxane.

However, an alternative method can be provided. Various types of addition curing products such as a two-pack type product having a mixing ratio of 1:1, and a product not containing fillers or the like are commercially available from the silicone manufacturers. In this case, one part of the two-pack type product (referred to as a "solution A") includes an alkenyl group-containing silicone and a platinum catalyst, and the other part (referred to as a "solution B") includes an alkenyl group-containing silicone and an organohydrogensiloxane. Although using the solution B of such a product as the silicone and the component related to curing in the composition for marking may not be the best method, it is preferred as the second best way. A curing retarder may be contained in the solution B. However, even if it is not contained in the solution B, readily available compounds can be appropriately added.

As a result of using the solution B alone, the silicone molding of the present invention may have a sticky or soft surface condition compared with that of the substrate. In such cases, adding a small amount of readily available organohydrogensiloxane or alkenyl group-containing polysiloxane can adjust the surface condition of the silicone molding close to that of the substrate. Since different organohydrogensiloxane is added without knowing the contents of the solution B, the amount to be added is experimentally determined to be an optimum value.

In the case where the substrate is a gel-like or putty-like material, it is often preferred to suppress the tackiness of the surface of the substrate while maintaining its physical properties to improve workability. In such a case, the tackiness of the substrate can be suppressed by adding an extra amount of organohydrogensiloxane to the composition for marking. Although this method cannot maintain the surface properties of the substrate, it is an example of the effect achievable with the silicone molding of the present invention.

It is preferable that the substrate and the phosphor-containing silicone thin layer are formed in an inseparable state in the silicone molding. This inseparable state can be achieved in various ways. To achieve the inseparable state, it is preferable that the silicone contained in the composition constituting the substrate is compatible with the silicone contained in the composition constituting the phosphor-containing silicone thin layer.

To achieve the inseparable state, when adhering the phosphor-containing silicone composition to the surface of the substrate, it is preferred that the substrate and the phosphor-containing silicone thin layer are covered with a protective film after or simultaneously with the application of the phosphor-containing silicone composition to the surface of the substrate in the form of a thin film. Although no particular limitation is imposed on the protective film, examples of the protective film include polyethylene films, polypropylene films, polyethylene terephthalate films, and polytetrafluoroethylene films. These film surfaces may be subjected to a release treatment. To adhere the protective film to the substrate and the phosphor-containing silicone thin layer surface, it is also preferable to apply pressure on the protective film after or simultaneously with covering the surfaces of the substrate and the phosphor-containing silicone thin layer with the protective film. Another preferred method is adhering the surface of the substrate to the surface of the protective film which has been coated beforehand with the phosphor-containing silicone composition.

A more preferred method for achieving the inseparable state is to perform the molding of the substrate, the formation of the phosphor-containing silicone thin film, and the adhesion of the protective film simultaneously. This method offers an improved productivity as well as high reliability in achieving the inseparable state between the substrate and the phosphor-containing thin layer. These methods are suitable for the substrate made of uncured materials such as putty to form a silicone molding in which the substrate and the phosphor-containing silicone thin film are in the inseparable state.

In the cases where the phosphor-containing silicone composition and the composition for the substrate have curing properties, a particularly effective and preferable method for achieving the inseparable state is simultaneous curing of the substrate and the phosphor-containing silicone thin layer. In this case, heat curing is further preferred.

The silicone molding of the present invention that is particularly recommended and can have the best performance is obtained under the following conditions. It is preferred that the composition for the substrate is capable of being heat cured by a peroxide or an addition reaction; the phosphor-containing silicone composition is a material having alkenyl group-containing silicone and an organohydrogensiloxane with no addition reaction catalyst; the surface of the protective film on which the phosphor-containing thin layer has been formed beforehand is pressed onto the surface of the substrate composition; the surface of the composition for the substrate is coated with the phosphor-containing thin layer, and then both are heat cured simultaneously.

Although no particular limitation is imposed on the method for applying the phosphor-containing silicone composition to the surface of the substrate or the surface of the protective film. An appropriate method can be selected from spraying, screen printing, bar coater, ink jet printing, gravure printing, a transfer method, and any conventionally-known method. It may be applied partially or to the whole substrate surface. It is preferred that the surface of the substrate is partially coated with the phosphor-containing silicone composition exclusively for the purpose of identification of the silicone molded components.

It is often the case that the surface of the substrate partially coated with the phosphor-containing silicone composition in a very small part can have sufficient identification properties. Therefore, moldings other than the silicone molding can be used for the substrate of the phosphor-containing identification substance of the present invention by limiting the coating of the phosphor-containing silicone composition to a degree not to impair the surface properties of the substrate. Such a substrate is not necessarily a polymer-based composition and may be, e.g., wood, paper, metal, ceramic and all other compositions.

Although no limitation is imposed on uses of the phosphor-containing identification substance of the present invention, it is practicable for the electronics or automobile-related assembly industries, especially in the field of a thermally conducting silicone sheet. For example in the case of the silicone molding, in the industrial assembly process, a plurality of thermally conducting silicone sheets as components having different characteristics, colors, thicknesses and sizes are commonly used in the same place. In such a process, the components capable of being easily identified without changing the inherent properties of the substrate are helpful to prevent mistakes such as confusion.

EXAMPLES

Next, the present invention is further specifically described by way of examples and comparative examples. It should be noted that the present invention is not limited to those examples.

<Luminescence from Phosphor>
Luminescence from the phosphor was observed using "black light ES27BLB" (UV peak wavelength of 365 nm) manufactured by Sankyo Electric Co., Ltd.

<Average Particle Diameter>
In a measurement of the average particle diameter, a laser diffracted light scattering method was applied to measure the 50% particle diameter. The measuring instrument is for example a laser diffraction/scattering particle size distribution analyzer manufactured by Horiba, Ltd.

Reference Example 1

A thermally conducting silicone composition was prepared in the following manner. Using two addition reaction curable silicone products, i.e., "CF5036A" and "CF5036B" (manufactured by Dow Corning Toray Co., Ltd.), 1 kg of each of the CF5036A and the CF5036B was mixed with 2.5 kg of an alumina having an average particle diameter of 30 μm, 1.2 kg of an alumina having an average particle diameter of 2 μm, and 0.1 kg of ferrosoferric oxide (colorant) having an average particle diameter of 0.017 μm. Each of the mixtures was degassed to obtain a solution A and solution B of the thermally conducting silicone composition. The solution A of the CF5036A contains a platinum catalyst; the solution B of the CF5036B contains a crosslinking agent having a SiH group.

Reference Example 2

A thermally conducting silicone composition was prepared in the following manner. 500 g of a peroxide curable silicone product "SH432" (manufactured by Dow Corning Toray Co., Ltd.) as a base, 1000 g of alumina having an average particle diameter of 2 μm, and 5 g of ferrosoferric oxide (colorant) having an average particle diameter of 0.17 μm were mixed with a kneader. The mixture was subjected to a defoaming process using a two-roll mill to obtain a peroxide curable thermally conducting silicone composition.

Reference Example 3

A thermally conducting silicone putty composition was prepared in the same way as in Example 1 except that a trimethylsiloxy-terminated polydimethylsiloxane having a viscosity of 0.5 Pa·s was used as a substitute for the CF5036AA and the CF5036B.

Example 1

The solution A and the solution B of the thermally conducting addition curable silicone gel composition prepared in Reference Example 1 were mixed at a weight ratio of 1:1. The mixture was subjected to a vacuum defoaming process and then placed on a polyethylene terephthalate (PET) film having a thickness of 0.3 mm, whereon a metal frame having a size of 150 mm×200 mm and a thickness of 0.5 mm is mounted, so as to spread the mixture over the inside of the metal frame to have a thickness of about 0.7 mm.

1.0 g of an organic invisible phosphor "D034" (needle shape, inorganic fluorescent pigment, specific gravity 1.02) manufactured by DayGlo Color Corp. was added without grinding to 20 g of the solution B of Reference Example 1 (CF5036 manufactured by Dow Corning Toray Co., Ltd.), and then mixed with a high shear centrifugal mixer to produce a phosphor-containing silicone composition. The phosphor-containing silicone composition was coated on another PET film using a bar coater having a coating thickness of 4.6 µm. The thickness of the silicone thin layer was 4.0 µm.

The PET film coated with the phosphor-containing silicone composition was placed on the thermally conducting addition curable silicone gel composition spread inside of the metal frame so that the coated surface of the PET film was brought into contact with the thermally conducting curable composition. The laminate was allowed to be pressed and heat-cured at 120° C. for 10 minutes to produce a silicone molding.

Figure 1B:
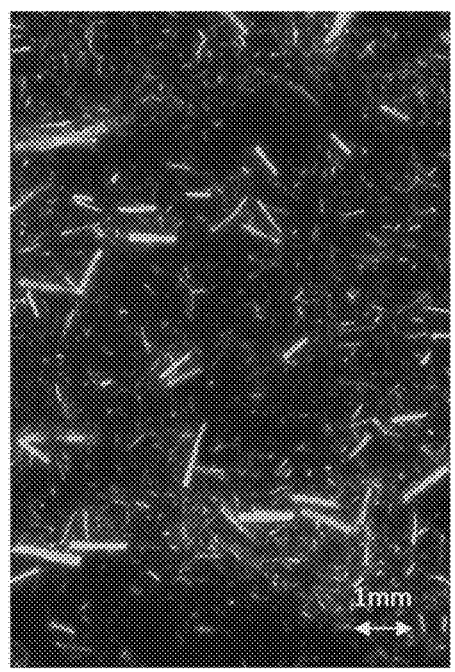
FIG. 1B is an observation photograph of the same under black light irradiation in one embodiment of the present invention.

The surface of the silicone molding was observed after peeling one side of the PET film coated with the phosphor-containing silicone (composition). The flexibility and tackiness of the surface was the same as that of the silicone molding obtained by curing the thermally conducting addition curable silicone gel composition prepared in Reference Example 1 alone to the same size. The needle-shape phosphor D034 was observed to emit yellow light by black light irradiation. The presence of the needle shape phosphor D034 was slightly confirmed but light emission was not observed, and the surface remained black gray in color under indoor illumination. Photographs of the observation are shown in FIG. 1. FIG. 1A is an observation photograph of a phosphor-containing identification substance formed of the silicone molding under the indoor general illumination in one embodiment of the present invention. FIG. 1B is an observation photograph of the same under black light irradiation. A transparent silicone thin layer formed on the surface of the silicone molding was observed to emit light by black light irradiation and thus its presence was confirmed.

On the surface of the phosphor-containing silicone thin film, a pressure-sensitive tape made of a PET film coated with a silicone adhesive was placed and pressed. The cured thermally conducting silicone gel layer as the substrate exhibited cohesive failure when the tape was peeled off. The results confirmed that the phosphor-containing silicone thin film and the substrate were identified as being in the inseparable state. Also the surface properties (flexibility and tackiness) of the silicone molding were the same as Comparative Example 1 below.

These results show that the silicone molding can easily be identified by black light irradiation, has excellent adhesive properties between the marking and the substrate, and further maintains the inherent properties of the substrate without being impaired by marking.

Examples 2-3, Comparative Example 1

A silicone molding was prepared in the same way as in Example 1 except that 0.2 g of an organic invisible phosphor "DINV-13" (average particle diameter 5 µm, organic non-ionogenic oxazine derivative pigment, specific gravity 1.4) manufactured by DayGlo Color Corp. (Example 2), and 0.2 g of an organic invisible phosphor "DINV-18" (average particle diameter 5 µm, quinazolinone pigment, specific gravity 1.02) manufactured by DayGlo Color Corp. (Example 3) were used as a substitute for the D034 in Example 1. The thickness of each of the silicon thin film was 3.5 µm.

Peeling tests were conducted by use of the silicone adhesive in the same way as in Example 1. In Examples 2 and 3, and Comparative Example 1, each of the cured thermally conducting silicone gel layers as the substrate exhibited cohesive failure. The results confirmed that the phosphor-containing silicone thin film and the substrate were in the inseparable state. Also the surface properties (flexibility and tackiness) of the silicone molding were the same as Comparative Example 1.

The results of the surface observation conducted in the same way as in Example 1 are summarized in Table 1. Comparative Example 1 in Table 1 is the silicone molding obtained by curing the thermally conducting addition curable silicone gel composition prepared in Reference Example alone to the same size. The results in Table 1 show that the silicone molding can easily be identified by black light irradiation, has excellent adhesive properties between the marking and the substrate, and further maintains the inherent properties of the substrate without being impaired by marking.

TABLE 1

| | | Example 2 | Example 3 | Comparative Example 1 |
|---|---|---|---|---|
| Phosphor-containing silicone composition | CF5036B solution | 20 g | 20 g | No |
| | Phosphor | DINV-13 | DINV-13 | |
| | Amount of phosphor added | 0.2 g | 1.0 g | |
| Observation under light irradiation | Black light irradiation | Emits Red light | Emits Green light | No light emission |
| | Room illumination | Black gray color. Phosphor was not confirmed | Black gray color. Phosphor was not confirmed | Black gray color |

TABLE 1-continued

|  |  | Example 2 | Example 3 | Comparative Example 1 |
|---|---|---|---|---|
| Surface properties | Flexibility | Same as Comparative Example | Same as Comparative Example | — |
|  | Tackiness | Same as Comparative Example | Same as Comparative Example | — |
| Result of peeling test by use of silicone adhesive |  | Cohesive failure in the thermally conducting silicone gel layer | Cohesive failure in the thermally conducting silicone gel layer | Cohesive failure in the thermally conducting |

Example 4

5 g of a peroxide composition "RC14A" (manufactured by Dow Corning Toray Co., Ltd.) for extrusion molding was added to 500 g of the peroxide curable thermally conducting silicone composition prepared in Reference Example 2, and then mixed and subjected to a defoaming process using a two-roll mill to prepare a peroxide curable silicone material for the substrate. A phosphor-containing silicone composition was prepared in the same way as in Example 1 except that 0.2 g of an inorganic invisible phosphor "IPO-13" (manufactured by DayGlo Color Corp.) was used as a substitute for the D034, and then the phosphor-containing silicone composition thus obtained was coated on the PET film. The peroxide curable silicone material for the substrate was placed on a PET film and covered with the phosphor-containing silicone composition coated PET film so that its coated surface was brought into contact with the peroxide curable silicone material for the substrate. The laminate was molded with a constant-speed roll to obtain a sheet for molding having a thickness of about 1 mm. The sheet for molding was heated in an oven at a temperature of 120° C. for 20 minutes to produce a silicone molding. The surface of the silicone molding was observed after peeling the PET film from the side coated with the phosphor-containing silicone composition. The surface properties of the silicone molding was the same as the silicone molding obtained by curing the thermally conducting addition curable silicone gel composition prepared in Reference Example 2 alone. The phosphor was observed to emit light by black light irradiation. The presence of the phosphor was slightly confirmed but light emission was not observed, and the surface remained black gray in color under indoor illumination. On the surface of the phosphor-containing silicone thin film, a pressure-sensitive tape made of a PET film coated with a silicone adhesive was placed and pressed. The adhesive face of the pressure-sensitive tape and the surface of the silicon molding were peeled off at the interface therebetween when the tape was peeled off. The peeled surface of the silicone molding was observed to emit light, while the surface of the adhesive tape hardly emitted light by black light irradiation. The cured thermally conducting silicone composition layer was damaged when the surface of the silicone molding was scratched with a spatula. The results confirmed that the phosphor-containing silicone thin film and the substrate were in the inseparable state. These results show that the peroxide cured silicone molding can easily be identified by black light irradiation, has excellent adhesive properties between the marking and the substrate, and further maintains the inherent properties of the substrate without being impaired by marking.

Example 5

A PET film coated with the phosphor-containing silicone composition obtained in the same way as Example 4 was prepared. The thermally conducting silicone putty composition prepared in Reference Example 3 was placed on a PET film and covered with the phosphor-containing silicone composition coated PET film so that its coated surface was brought into contact with the silicone putty material. The laminate was molded with a constant-speed roll to obtain a sheet for molding having a thickness of about 0.3 mm. The sheet for molding was left at room temperature for two hours to produce a putty-like silicone molding. The surface of the PET film and the surface of the putty-like silicone molding were irradiated with black light after peeling the phosphor-containing silicone composition coated PET film. The surface of the putty-like silicone molding alone was observed to emit light by black light irradiation and the phosphor-containing silicone thin film was confirmed as being adhered to the surface of the putty-like silicone molding. On the surface of the silicone molding to which the phosphor-containing silicone thin film is adhered, the same pressure-sensitive tape as that of Example 1 was placed and pressed. The thermally conducting silicone putty composition layer exhibited cohesive failure when the tape was peeled off. The results confirmed that the phosphor-containing silicone thin film and the substrate were in the inseparable state. Also the surface properties (flexibility and tackiness) of the silicone molding were the same as those of the thermally conducting silicone putty obtained in the same way as Reference Example 3 without using the phosphor-containing silicone thin film. These results show that the non-cured putty-like peroxide cured silicone molding can easily be identified by black light irradiation, has excellent adhesive properties between the marking and the substrate, and further maintains the inherent properties of the substrate without being impaired by marking.

INDUSTRIAL APPLICABILITY

The phosphor-containing identification substance of the present invention is applicable to resins, paper, metal, ceramics, and fibers. Specifically, it is applicable for product marks to indicate various products information such as the place of production, production date, ingredients, and quality of products, and also applicable for authenticity determination marks.

The invention claimed is:
1. A phosphor-containing identification substance comprising:
   a substrate comprising a main polymer component; and
   a phosphor-containing silicone thin layer, wherein a whole or part of a surface of the substrate is covered with the phosphor-containing silicone thin layer, the main polymer component of the substrate is silicone, and the substrate and the phosphor-containing silicone thin layer are in an inseparable state, the phosphor-containing silicone thin layer is present on the surface of the substrate, a silicone composition that forms the phosphor-containing silicone thin layer does not have self-curing performance, but is cured in contact with the substrate, and the phosphor-containing silicone thin layer has identification properties in which the phosphor-containing silicone thin layer emits visible light when irradiated with ultraviolet rays or black light, and does not emit visible light when irradiated with visible rays.

2. The phosphor-containing identification substance according to claim 1, wherein the substrate is a cured material.

3. The phosphor-containing identification substance according to claim 1, wherein silicone as the main polymer component of the substrate is compatible with the silicone contained in the silicone composition that forms the phosphor-containing the silicone thin layer.

4. The phosphor-containing identification substance according to claim 1, wherein the substrate is a thermally conducting silicone composition.

5. The phosphor-containing identification substance according to claim 1, wherein the phosphor-containing silicone thin layer has a thickness of 0.1 to 20 μm.

6. The phosphor-containing identification substance according to claim 1, wherein the substrate is in the form of putty.

7. The phosphor-containing identification substance according to claim 1, wherein the phosphor has a needle shape or a particle shape.

8. A method for producing a phosphor-containing identification substance comprising:

a substrate comprising a main polymer component; and
a phosphor-containing silicone thin layer,
wherein a whole or part of a surface of the substrate is covered with the phosphor-containing silicone thin layer, the main polymer component of the substrate is silicone, and the substrate and the phosphor-containing silicone thin layer are in an inseparable state, the phosphor-containing silicone thin layer is present on the surface of the substrate, and the phosphor-containing silicone thin layer has identification properties in which the phosphor-containing silicone thin layer emits visible light when irradiated with ultraviolet rays or black light, and does not emit visible light when irradiated with visible rays, the method comprising:

bringing a thin layer of a phosphor-containing silicone composition into contact with the surface of the substrate after or simultaneously with molding of the substrate; and then heat-curing the substrate and the thin layer of the phosphor-containing silicone composition simultaneously, wherein the phosphor-containing silicone composition comprises (A) a silicone polymer having two or more alkenyl groups per molecule, (B) an organohydrogensiloxane having a number of SiH groups sufficient to allow the component (A) to be cured, and (C) a phosphor as a component, and does not contain a compound that serves as a catalyst for a reaction between the component (A) and the component (B), and wherein the substrate contains a compound that serves as a curing catalyst for the silicone polymer.

9. The method for producing the phosphor-containing identification substance according to claim 8, wherein the phosphor-containing silicone composition further comprises as a component (D) a compound that retards an addition reaction between the alkenyl groups and the SiH groups.

10. The method for producing the phosphor-containing identification substance according to claim 8, wherein the substrate is cured by a hydrosilylation reaction or a peroxide.

11. The method for producing the phosphor-containing identification substance according to claim 8, wherein a surface on which the thin layer of the phosphor-containing silicone composition is to be formed is covered with a release film.

12. The method for producing the phosphor-containing identification substance according to claim 8, comprising:

coating a whole or part of a surface of a release film with the phosphor-containing silicone composition; and bringing the coated surface into contact with the substrate so that the phosphor-containing silicone composition is transferred to the surface of the substrate.

13. The method for producing the phosphor-containing identification substance according to claim 8, wherein silicone as the main polymer component of the substrate is compatible with silicone contained in the phosphor-containing silicone composition.

* * * * *